United States Patent
Yumii

(10) Patent No.: US 9,180,738 B2
(45) Date of Patent: Nov. 10, 2015

(54) PNEUMATIC TIRE WITH TREAD HAVING LATERAL GROOVES

(75) Inventor: Keita Yumii, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1084 days.

(21) Appl. No.: 10/558,255

(22) PCT Filed: May 10, 2004

(86) PCT No.: PCT/JP2004/006247
§ 371 (c)(1),
(2), (4) Date: Nov. 21, 2005

(87) PCT Pub. No.: WO2004/103737
PCT Pub. Date: Dec. 2, 2004

(65) Prior Publication Data
US 2007/0051448 A1    Mar. 8, 2007

(30) Foreign Application Priority Data
May 21, 2003    (JP) .................................. 2003-142984

(51) Int. Cl.
*B60C 11/03*    (2006.01)
*B60C 11/04*    (2006.01)
*B60C 11/12*    (2006.01)

(52) U.S. Cl.
CPC ............. *B60C 11/03* (2013.01); *B60C 11/0318* (2013.04); *B60C 11/0306* (2013.04);
(Continued)

(58) Field of Classification Search
CPC ............ B60C 11/03; B60C 2011/0381; B60C 2011/0383; B60C 11/04; B60C 11/12; B60C 2011/0365; B60C 2011/0376; B60C 2011/0388; B60C 2011/039; B60C 2011/1209; B60C 11/0332
USPC ............ 152/209.1, 209.18, 209.28, 900, 901, 152/DIG. 3
See application file for complete search history.

(56) References Cited

U.S. PATENT DOCUMENTS 2,756,460 A * 7/1956 Heintz, Jr. ..................... 425/28.1
4,387,754 A * 6/1983 Mirtain et al. ................. 152/901
(Continued)

FOREIGN PATENT DOCUMENTS

CN    2445952 Y    9/2001
DE    4447417 A1 *    7/1996
(Continued)

OTHER PUBLICATIONS

Machine translation for Japan 06-055913 (no date).*
(Continued)

*Primary Examiner* — Steven D Maki
(74) *Attorney, Agent, or Firm* — Sughrue Mion, PLLC

(57) ABSTRACT

A pneumatic tire reduces the columnar resonance noise of the tire while controlling the lowering of wet performances, wherein four circumferential grooves continuously extending in the circumferential direction of the tire are disposed in a treading face and a plurality of lateral grooves each having one end opened to the circumferential groove and terminated in a land portion are formed with respect to two circumferential grooves among the four circumferential grooves, and these lateral grooves and the respective circumferential grooves have such a groove width that both groove walls of the groove do not contact with each other in a ground contact face and one or more lateral groove are always completely included in the ground contact face, and an extending length of a portion of each lateral groove in the ground contact face having a groove width of the lateral groove corresponding to not less than 30% of a groove width of the circumferential groove is made not less than 40% of an extending length of the circumferential groove in the ground contact face.

5 Claims, 7 Drawing Sheets

(52) U.S. Cl.
CPC ............. *B60C11/0332* (2013.04); *B60C 11/04* (2013.01); *B60C 11/12* (2013.01); *B60C 2011/039* (2013.04); *B60C 2011/0365* (2013.04); *B60C 2011/0376* (2013.04); *B60C 2011/0381* (2013.04); *B60C 2011/0383* (2013.04); *B60C 2011/0388* (2013.04); *B60C 2011/1209* (2013.04)

(56) References Cited

U.S. PATENT DOCUMENTS

| | | | | |
|---|---|---|---|---|
| 4,566,514 | A | * | 1/1986 | Mauk et al. ............... 152/DIG. 3 |
| 4,878,526 | A | * | 11/1989 | Ochiai ...................... 152/DIG. 3 |
| 5,482,099 | A | * | 1/1996 | Kajiwara et al. ............ 152/209.1 |
| 5,959,265 | A | * | 9/1999 | Van Ligten .................... 181/286 |
| 6,109,317 | A | * | 8/2000 | Iwamura et al. ......... 152/209.18 |
| 6,371,180 | B1 | * | 4/2002 | Hayashi ................... 152/209.28 |
| 6,892,775 | B1 | * | 5/2005 | Himuro .................... 152/209.28 |
| 6,923,232 | B1 | * | 8/2005 | Welbes et al. ............ 152/209.18 |
| 2004/0069389 | A1 | * | 4/2004 | Ratliff, Jr. ................. 152/209.28 |
| 2006/0137791 | A1 | * | 6/2006 | Miyabe et al. ............ 152/209.28 |
| 2014/0124111 | A1 | * | 5/2014 | Yumii ....................... 152/209.18 |

FOREIGN PATENT DOCUMENTS

| | | | | |
|---|---|---|---|---|
| JP | 4-2508 | A | | 1/1992 |
| JP | 06-055913 | | * | 3/1994 |
| JP | 06-143932 | A | | 5/1994 |
| JP | 06-191226 | A | * | 7/1994 |
| JP | 6-191226 | A | | 7/1994 |
| JP | 06-199109 | | * | 7/1994 |
| JP | 6-199109 | A | | 7/1994 |
| JP | 07-076203 | A | * | 3/1995 |
| JP | 07-285303 | A | * | 10/1995 |
| JP | 07-290907 | | * | 11/1995 |
| JP | 07-290909 | | * | 11/1995 |
| JP | 10-166815 | | * | 6/1998 |
| JP | 10-230712 | | * | 9/1998 |
| JP | 11-334317 | | * | 12/1999 |
| JP | 11-334317 | A | | 12/1999 |
| JP | 2000-118207 | A | * | 4/2000 |
| JP | 2002-316515 | A | | 10/2002 |
| JP | 2003-011616 | | * | 1/2003 |
| JP | 2003-146018 | A | | 5/2003 |
| WO | 02/078982 | A1 | | 10/2002 |

OTHER PUBLICATIONS

Machine translation for Japan 07-285303 (no date).*
Machine translation for Japan 2000-118207 (no date).*
Machine translation for Japan 07-076203 (no date).*
Partial translation of Japan 07-076203 (no date).*
Machine translation of German 4,447,417 (no date).*
Machine translation for Japan 06-191226 (no date).*
Chinese Office Action dated Jan. 18, 2008.
European Office Action dated Jun. 8, 2009 issued in corresponding European Application No. 04732011.4.
European Office Action dated Jul. 19, 2011 issued in corresponding European Application No. 04732011.4.
Extended European Search Reported dated Jul. 30, 2014 issued in corresponding European Application No. 12151837.7.
Communication dated Jun. 18, 2015, issued by the United States Patent and Trademark Office in counterpart U.S. Appl. No. 12/476,031.

* cited by examiner

PNEUMATIC TIRE WITH TREAD HAVING LATERAL GROOVES

TECHNICAL FIELD

This invention relates to a pneumatic tire effectively reducing a tire noise, particularly a columnar resonance at a frequency of approximately 800-1400 Hz without substantially lowering wet performances of the tire and a method of designing a tread pattern of the tire.

BACKGROUND ART

As the ratio of tire noise occupied in automobile noise becomes relatively large accompanied with a further improvement of the silence in recent vehicles, the reduction of such a tire noise is a significant matter. In especial, the tire noise at about 1000 Hz easily hearing with the human ears becomes a main factor of the off-vehicle noise and the prompt counter-measures with respect to this noise are also demanded from a viewpoint of the environmental problems.

In general, it is known that the tire noise at approximately 800-1400 Hz is generated by a columnar resonance resulted from the occurrence of the resonance in an air column defined between a circumferential groove of the tire and a road surface in the ground contact face of the tire. In order to control such a columnar resonance, it is known that the reduction of the groove volume in the circumferential groove is effective.

However, the reduction of the groove volume in the circumferential groove is obliged to lower the drainage property of the tire and hence the wet performance thereof. For the purpose of reducing the tire noise without lowering the wet performance, for example, JP-A-6-143932 proposes a pneumatic tire wherein one wide-width circumferential groove having a groove width of 25-70 mm is formed in a central region of the tread and lateral grooves each opening to a ground contact end of the tread but not opening to the wide-width circumferential groove and having a groove width corresponding to 5-15% of the wide-width circumferential groove are formed at both side portions of the wide-width circumferential groove.

In this proposed tire, however, the large decrease of the ground contact face of the tread necessarily arises because of the existence of the wide-width circumferential groove and also the large stepwise difference of the ground contact pressure in the widthwise direction of the tread can not be avoided so that this tire has a problem that it becomes particularly difficult to simultaneously establish the steering stability and the limit gripping property on a dry road surface.

The invention is to solve such a problem of the conventional technique and to provide a pneumatic tire largely reducing a columnar resonance of the tire while attaining the sufficient establishment of the steering stability and limit gripping property on the dray road surface but also effectively controlling the lowering of the wet performance as well as a method of designing a tread pattern of the tire.

DISCLOSURE OF THE INVENTION

The invention is a pneumatic tire comprising a tread in which not less than two circumferential grooves continuously extending in the circumferential direction of the tire are disposed in a treading face and a plurality of lateral grooves, each having one end opened to at least one predetermined circumferential groove and the other end terminated in a land portion, are independently formed from another circumferential groove(s) other than the predetermined circumferential groove and another lateral grooves opened to a ground contact end of the tread, and each of the predetermined circumferential groove and lateral grooves has such a groove width that groove walls do not contact with each other at a tire posture when the tire is mounted on an approved rim and filled with a maximum air pressure and loaded with a mass corresponding to a maximum load capacity, and at least one of the lateral grooves is always completely included in a ground contact face of the tread, and an extending length of a portion of each lateral groove in the ground contact face having a groove width of the lateral groove corresponding to not less than 30% of a groove width of the predetermined circumferential groove is made not less than 40% of an extending length of the predetermined circumferential groove in the ground contact face.

The term "approved rim" used herein means a rim defined in the following standard, the term "maximum air pressure" used herein means an air pressure corresponding to a maximum load capacity defined in the following standard, and the term "maximum load capacity" means a maximum mass allowed to be applied to the tire in the following standard.

This standard is determined by an effective industrial standard available at an area in which the tires are produced or used, respectively. For example, there are mentioned "Year Book published by The Tire and Rim Association Inc." in USA, "Standards Manual published by The European Tyre and Rim Technical Organization" in Europe, and "JATMA YEAR BOOK published by The JAPAN AUTOMOBILE TIRE MANUFACTURERS ASSOCIATION, INC." in Japan.

Also, the term "treading face" used herein means a surface region of a tread rubber contacting with a flat plate when the tire is mounted the tire on the approved rim and placed vertically on the flat plate under an inflation of the maximum air pressure and loaded with a mass corresponding to the maximum load capacity.

The columnar resonance is generated by oscillating an air column defined between the circumferential groove and the road surface in the ground contact face based on vibration of each part of the tire during the running to cause a resonant vibration with a wavelength of 2 times the length of the air column. In this case, a frequency $f_0$ of the columnar resonance is represented by $f_0 = v/2L$ when a sonic speed is v and a ground contact length in the circumferential direction of the treading face, that is, the length of the circumferential groove included therein is L.

And also, such a columnar resonance results in the occurrence of only a columnar resonance having one specified frequency in such a tread pattern of the tire that a plurality of circumferential grooves continuously extending in the circumferential direction of the tread are communicated to each other through a lateral groove extended so as to cross with the circumferential grooves.

Moreover, the width, depth and number of the circumferential grooves largely influence the sound pressure level of the resonance rather than the resonant frequency.

As a result of the examinations on the influence of the lateral groove upon the resonance phenomenon of the circumferential groove, it becomes clear that when the lateral groove is terminated in a halfway of the land portion, the sound is absorbed at a frequency f represented by $f=(2n-1) \times v/4l$, wherein l is a length of the lateral groove in the ground contact face, v is a sonic speed and n is an order of vibration (n=1, 3, 5 - - - ).

Therefore, when such a sound-absorbing frequency is made close to a frequency of about 800-1400 Hz being the columnar resonance frequency of the circumferential groove, it is possible to reduce the resonance noise.

In addition, it becomes clear that the width, depth and number of the lateral grooves largely affect a sound-absorbing capacity rather than the sound-absorbing frequency.

Since the columnar resonance frequency changes within a range of about 800-1400 Hz in accordance with the ground contact length of the treading face, it is required that in order to make the sound-absorbing frequency to the columnar resonance frequency, the ratio of the extending length of the lateral groove included in the ground contact face to the length of the circumferential groove is made not less than 40%, more preferably, not less than 40% but not more than 90%.

When the ratio is less than 40%, the sound-absorbing frequency largely differs from a range of the columnar resonance frequency, and hence it is difficult to expect the effective reduction of the resonance noise.

Moreover, in order to sufficiently develop such a sound-absorbing function in the lateral groove, it is necessary that the groove walls of the lateral groove do not contact with each other in the ground contact face and one or more lateral grooves opened to the predetermined circumferential groove are always completely included in the ground contact face.

In this case, the reason why the extending length of the lateral groove is limited to the length of the part of the lateral groove having a groove width corresponding to not less than 30% of the groove width of the circumferential groove is due to the fact that when the groove width is less than the above, the sound absorbing effect can not sufficiently be obtained because the groove width of the lateral groove in the contact with the road surface is narrow and the groove volume is small.

In addition, the lateral groove having one end opened to the predetermined circumferential groove and the other end terminated in the land portion is formed without crossing with any of the other lateral grooves opened to the other circumferential grooves and another lateral grooves opened to the ground contact end of the tread to control the resonance frequency in the predetermined circumferential groove, whereby the resonance frequency in a plurality of the circumferential grooves during the running of the tire under loading can effectively be dispersed, and as a result, the peak level in noise can be reduced and the change to white noise can largely be promoted as compared with the case of generating the columnar resonance noise with only the one specified frequency.

On the other hand, according to the invention, the increase and decrease of the groove volume in the plural circumferential grooves and the like have no use for general tires, so that excellent wet performances can be realized while sufficiently establishing both the steering stability and the limit grip property on the dry road surface without largely changing a basic tone of the existing tread pattern.

In such a tire, the formation of the lateral groove with respect to a target predetermined circumferential groove can be conducted at only one side of this circumferential groove but also at both sides thereof. In any case, the desired function can sufficiently be developed in the lateral grooves opened to the circumferential groove.

When the lateral grooves are disposed at both sides of the circumferential groove, if all of the lateral grooves are the same size, a larger sound-absorbing effect can be obtained by the increase of the lateral groove number in the treading face as compared with a case of forming the lateral grooves at only one side of the circumferential groove. In addition, the lowering of compression and the shearing rigidities due to the increase of the lateral groove number can be controlled as compared with the case of forming the same number of the lateral grooves at only one side of the circumferential groove, whereby the deterioration of the steering stability and the like can be prevented.

Furthermore, when at least one sub-groove having one end opened to the lateral groove and the other end terminating in the land portion is formed to the lateral groove while being independently separated from another lateral grooves, the wet performances are more improved, and also it is possible to more reduce the columnar resonance noise because a sum of the space volumes of the lateral groove and the sub-groove is proportional to the sound-absorbing effect.

In the tire of the invention, two or more of the predetermined circumferential grooves opening the lateral grooves can be formed in the treading face. Even in this case, the same function and effect as mentioned above can be attained by dispersing the resonance frequency with another circumferential grooves.

In addition, when a plurality of shoulder lateral grooves are disposed so as to extend between each of a pair of another circumferential grooves located furthest away from an equatorial line of the tire and each of the ground contact ends of the tread and opened to both of them, the resonance frequency in these circumferential grooves can be largely enhanced as compared with that in the above predetermined circumferential groove, and hence the effect of dispersing the resonance frequency is further improved.

In this case, the groove width of the shoulder lateral groove is preferable to be 1-3 mm in the ground contact face. Thus, the impact sound of the lateral groove on the road surface hardly worsens and the effect through the dispersion of the resonance frequency can be utilized at maximum.

When the groove width is less than 1 mm, the effect of dispersing the resonance frequency through the shoulder lateral groove becomes extremely small because the volume of the lateral groove becomes small, and the reduction of the columnar resonance noise is hardly obtained. While, when it exceeds 3 mm, the effect of dispersing the frequency becomes large, but the impact sound on the road surface and the vibration of the groove wall are increased accompanied with the increase of the groove width, and the noise level is inversely deteriorated by the factors other than the resonance.

The method of designing a tread pattern of a pneumatic tire according to the invention is a method of designing a tread pattern of a pneumatic tire in which not less than two circumferential grooves continuously extending in the circumferential direction of the tire are disposed in a treading face and a plurality of lateral grooves, each having one end opened to at least one predetermined circumferential groove and the other end terminated in a land portion are independently formed from another circumferential groove(s) other than the predetermined circumferential groove and another lateral grooves opened to a ground contact end of the tread, and each of the predetermined circumferential groove and lateral grooves has such a groove width that groove walls do not contact with each other at a tire posture when the tire is mounted on an approved rim and filled with a maximum air pressure and loaded with a mass corresponding to a maximum load capacity, wherein a length l of the lateral groove in the ground contact face under an action of the maximum load capacity is selected so that a frequency represented by $f=(2n-1)\times v/4l$ (v: sonic speed, n: order of vibration (n=1)) falls within a range of 800-1400 Hz.

According to this method, as seen from the aforementioned descriptions, the columnar resonance of the circumferential groove can be effectively reduced by specifying the required groove width, groove depth and groove number under the selection of the length of the lateral groove.

Moreover, the reason for limiting to n=1 is due to the fact that when n is 3, 5 or the like, it is necessary to lengthen the length of the lateral groove to the unattainable degree in the limited land portion.

BEST MODE FOR CARRYING OUT THE INVENTION

Embodiments of the invention will be explained with reference to the accompanying drawings below.

Figure 1:
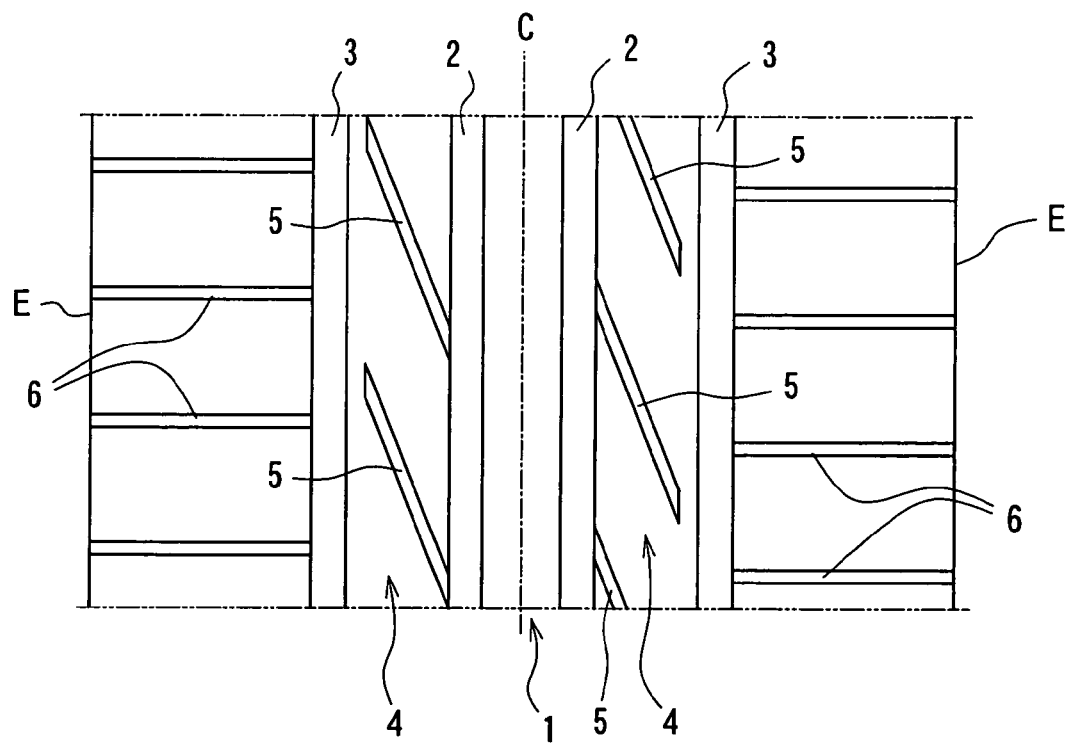
FIG. 1 is a developed view of a tread pattern of a pneumatic tire showing an embodiment of the invention.

FIG. 1 is a developed view of a tread pattern of a pneumatic tire schematically showing an embodiment of the invention.

Moreover, the inner reinforcing structure or the like of this tire is the same as in a general radial tire, so that the illustration thereof is omitted.

Numeral 1 in this figure is a treading face. In this treading face 1 are disposed two pairs of circumferential grooves 2, 3 located symmetrically with respect to an equatorial line C of the tire and continuously extending straight in a circumferential direction.

With respect to a pair of center-side circumferential grooves 2 located close to the equatorial line C of the tire among these circumferential grooves 2, 3 are disposed a plurality of lateral grooves 5 each extending in a land portion 4 located at a side opposite to the equatorial line C and having one end opened to the circumferential groove 2 and the other end terminated in the land portion 4 so as to extend straight downward to the right in this figure. Each of these lateral grooves 5 is completely independently formed from another lateral grooves capable of disposing so as to be opened to another circumferential grooves 3.

Also, each of a pair of shoulder side circumferential grooves 3 located away from the equatorial line C of the tire and each of ground contact ends E of the tread are communicated with each other by a plurality of shoulder lateral grooves 6 continuously extending between the shoulder-side circumferential grooves 3 and the ground contact end E and opened to both of them. Moreover, each of the shoulder lateral grooves 6 is formed by extending straight in a direction substantially perpendicular to the circumferential groove 3.

Figure 2:
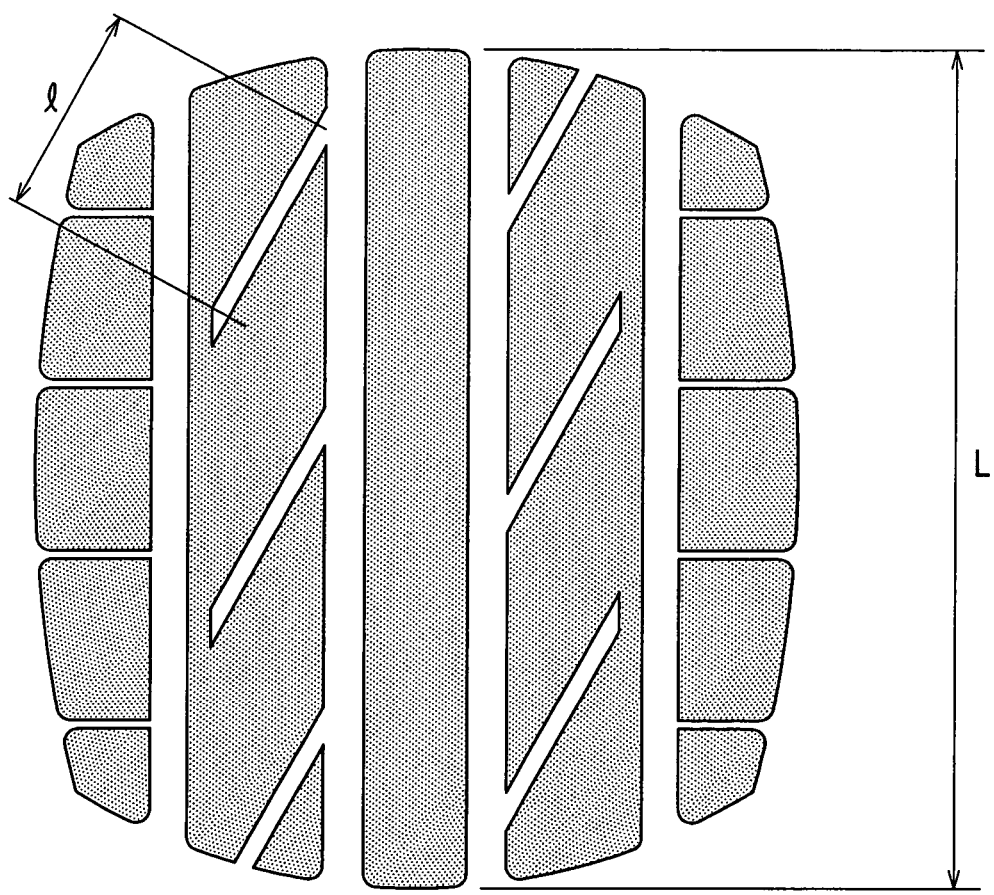
FIG. 2 is a view showing a footprint of the tire of FIG. 1.

In the above tread pattern of the tire, under such a state that the tire is mounted on an approved rim and filled with a maximum air pressure and loaded to a mss corresponding to a maximum load capacity, as seen from a footprint of FIG. 2, the groove widths of the circumferential groove 2 but also the lateral groove 5 have a size that groove walls of each groove do not contact with each other in a ground contact face and an arranging form that one or more of the lateral grooves 5 is always completely included in the ground contact face. Further, an extending length of a portion of the lateral groove 5 having a groove width of the lateral groove corresponding to not less than 30% of a groove width of the circumferential groove 2 in the ground contact face, i.e. a whole length l of the lateral groove 5 shown in FIG. 2 is made not less than 40% of an extending length L of the circumferential groove 2 in the ground contact face.

According to the tire having such a construction, under the formation of the plural circumferential grooves and the like as mentioned above, excellent wet performances can be ensured while simultaneously establishing the steering stability and the limit grip property on the dry road surface, and also the columnar resonance frequencies of the respective circumferential grooves 2, 3 can be made different with each other. For example, the resonance frequency of the circumferential groove 2 can be made considerably small as compared with that of the circumferential groove 3, whereby the peak level of the columnar resonance noise can effectively be reduced and the change to white noise can largely be promoted.

Figure 3:
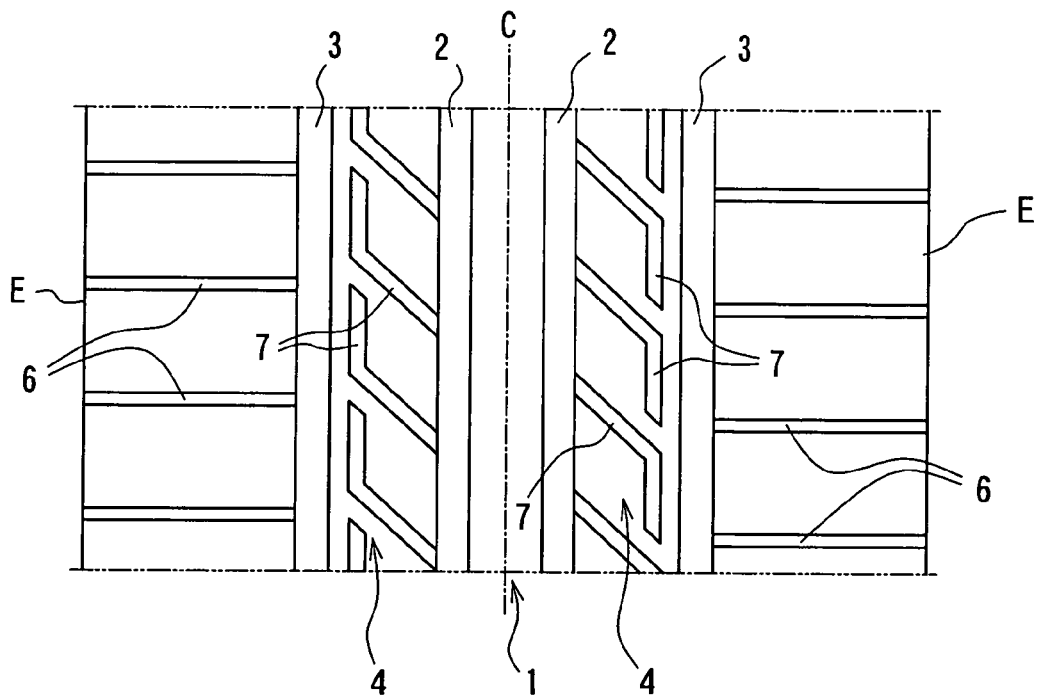
FIG. 3 is a developed view of another tread pattern.

FIG. 3 is a developed view showing another embodiment of the tread pattern. In this embodiment, each of lateral grooves 7 having an end opened to the circumferential groove 2 is extended substantially in a hook form and has the other end corresponding to the tip of the lateral groove 5 added with a bent portion substantially parallel to the circumferential grooves 2, 3, and the other portions are the same as in FIG. 1.

According to this embodiment, a total length of each lateral groove 7 having a sufficient groove width can be lengthened as compared with that of the lateral groove 5 shown in FIG. 1 and the sound-absorbing frequency can be approximated to the columnar resonance frequency as compared with the tire of FIG. 1, so that the resonance noise can be more effectively absorbed to advantageously reduce the overall level of the tire noise.

And also, a crossing angle between the lateral groove 7 and the circumferential groove 2 can be made larger than that of FIG. 1, so that the occurrence of the uneven wear at a corner part of the land portion defined by these grooves can also advantageously be controlled.

Figure 4:
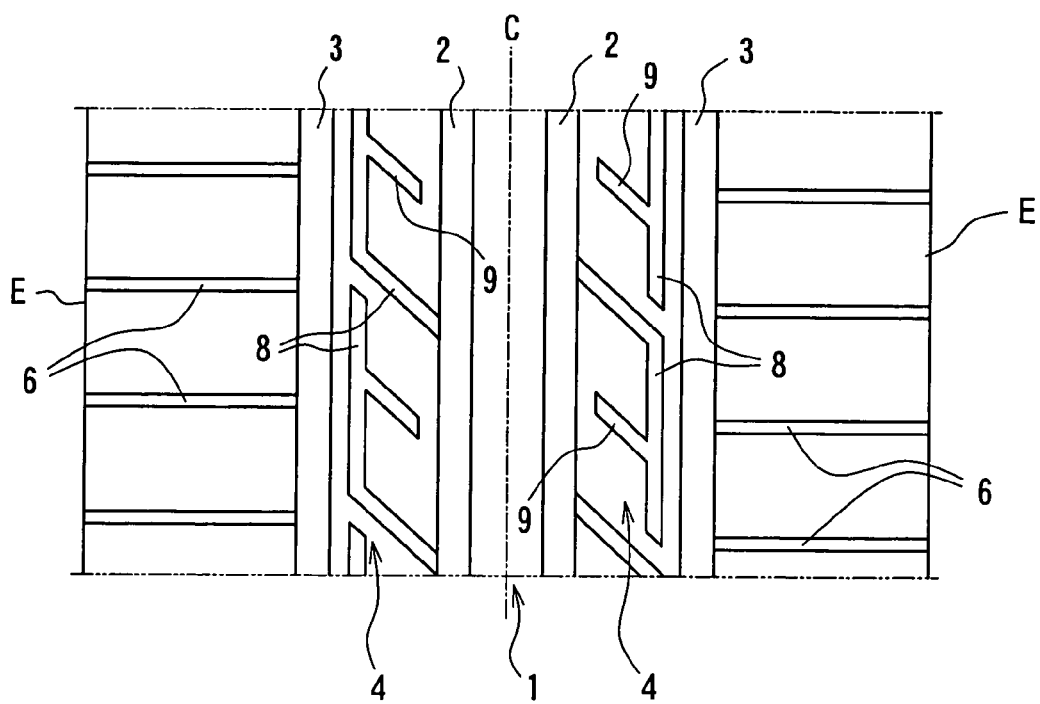
FIG. 4 is a developed view of the other tread pattern.

In a tread pattern shown in FIG. 4, a lateral groove 8 opened to the circumferential groove 2 has a bent portion substantially parallel to the circumferential grooves 2, 3, an extending length of which is made longer than that shown in FIG. 3, and a sub-groove 9 having an end opened to the bent portion and the other end terminated in the land portion 4 is disposed so as to extend substantially parallel to a connecting portion of the lateral groove 8 to the circumferential groove 2 without crossing with any grooves.

According to this embodiment, the further improvement of the wet performance and the more further reduction of the columnar resonance noise can be realized under a cooperation of the lateral groove 8 and the sub-groove 9 as previously mentioned.

Figure 5:
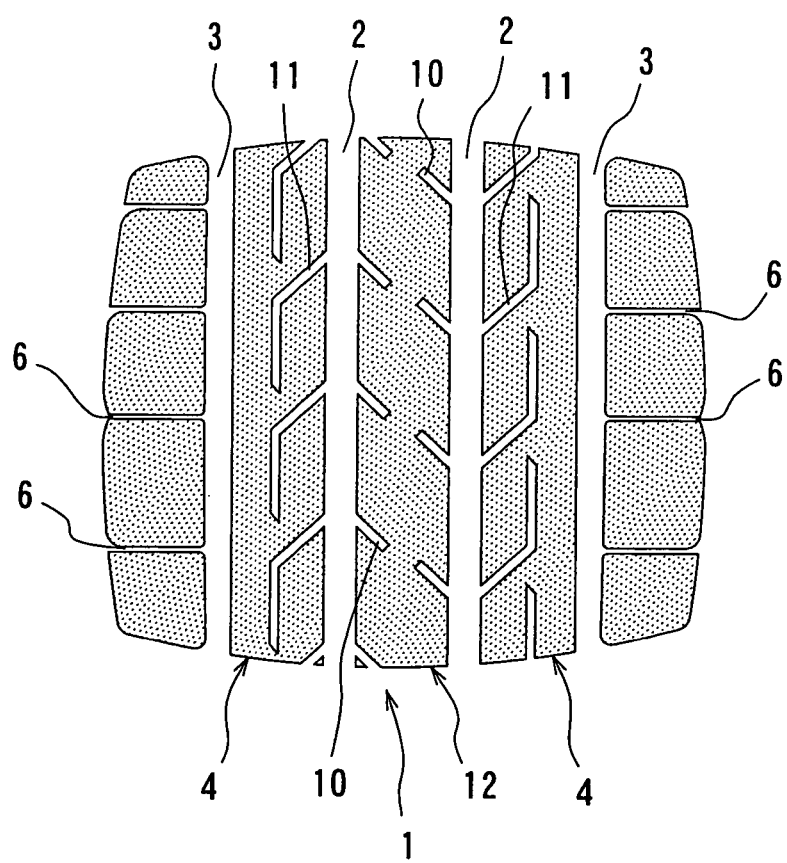
FIG. 5 is a view showing a footprint of the other tire.

FIG. 5 is a footprint showing another tread pattern of the tire according to the invention, which shows a case that the tire is contacted with ground under the aforementioned conditions.

In this case, with respect to the pair of center-side circumferential grooves 2, lateral grooves 10, 11 respectively extending at both sides of one circumferential groove are arranged so as to have a tendency of substantially a V-shape as a whole, while they are arranged at the other circumferential groove 2 so as to have a tendency of substantially an inverted V-shape. Each of the pair of lateral grooves 10, 11 is opened to the circumferential grooves 2 at substantially the same position in the circumferential direction. Also, each of the lateral grooves 10 extending in a land portion 12 located at a center side from the circumferential groove 2 is formed downward to the right in this figure, while each of the lateral grooves 11 extending in the land portion 4 located at a shoulder side from the circumferential groove 2 is formed upward to the right. Further, each of the lateral grooves 11 is provided with a bent portion extending close to the shoulder-side circumferential groove 3 and substantially in parallel thereto.

In this illustrated embodiment, only the shoulder-side lateral grooves 11 satisfy a given groove-width condition over approximately a full length in the ground contact face and also satisfy a given length condition.

Even in such a tread pattern, the resonance frequencies of the respective circumferential grooves 2, 3 can be made sufficiently different with each other to effectively develop a desired function of noise reduction.

Figure 6:
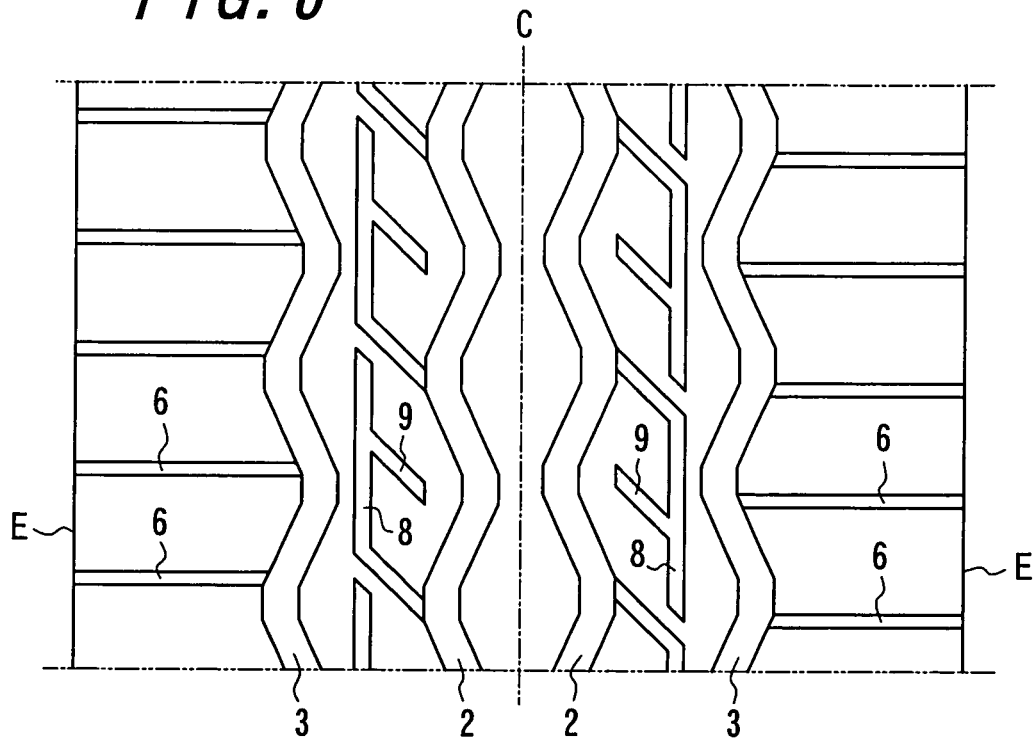
FIG. 6 is a developed view of a further tread pattern.

FIG. 6 is a developed view showing the other tread pattern. In this case, two pairs of circumferential grooves 2, 3 extend in the zigzag form, and the same lateral groove 8 as described in FIG. 4 is formed by directly opening to the center-side circumferential groove 2, and the sub-groove 9 is formed by indirectly opening to the center-side circumferential groove 2, and the shoulder lateral groove 6 extending substantially in the widthwise direction of the tread and opened to the ground contact end E of the tread is formed by opening to the shoulder-side circumferential groove 3.

Even in this tire, the improvement of the wet performance and the reduction of the columnar resonance noise can be realized under the cooperation of the lateral groove 8 and the sub-groove 9 as previously mentioned.

Figure 7:
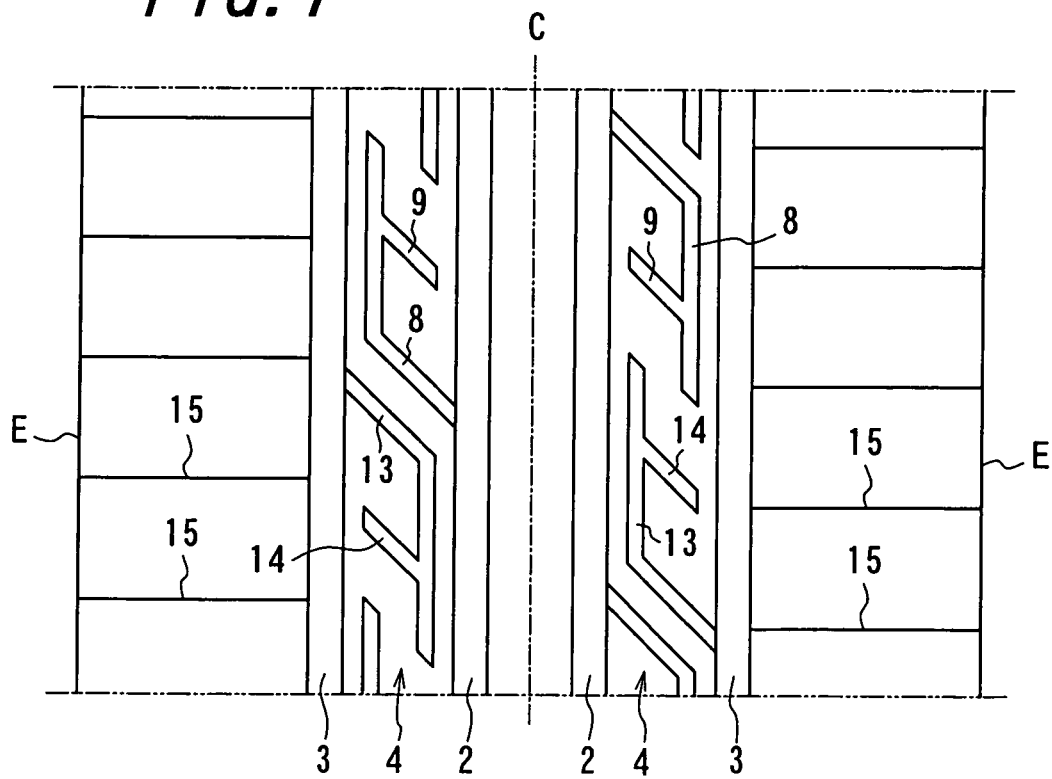
FIG. 7 is a developed view of a still further tread pattern.

FIG. 7 is a developed view of another tread pattern.

In this case, two pairs of circumferential grooves 2, 3 are disposed to extend straight in the circumferential direction, In the land portion 4 defined between these circumferential grooves 2 and 3 are formed the lateral groove 8 directly opening to the center-side circumferential groove 2 and the sub-groove 9 indirectly opening thereto likewise the cases of FIGS. 4 and 6, while a lateral groove 13 and a sub-groove 14 directly or indirectly opening to the shoulder-side circumferential groove 3 are formed in a point symmetry with respect to the lateral groove 8 and the sub-groove 9 therebetween in the land portion 4. The shoulder-side circumferential groove 3 is communicated with the ground contact end E of the tread through sipes 15 each extending substantially in the widthwise direction of the tread at such a width that the groove walls contact with each other in the ground contact face.

In this embodiment, as the groove walls of the sipe 15 contact with each other in the ground contact face, not only the lateral grooves 8 but also the lateral grooves 13 independently exist from another circumferential groove and another lateral groove capable of opening to the ground contact end of the tread, and can effectively contribute to the sound absorption together with the respective sub-grooves 9, 14.

Even in such a tread pattern, the approach form of the respective grooves into the ground contact face of the tread differs between a combination of the center-side circumferential groove 2, the lateral groove 8 and the sub-groove 9 and a combination of the shoulder-side circumferential groove 3, the lateral groove 13 and the sub-groove 14, and the columnar resonance frequencies in the respective groove portions including the respective circumferential grooves 2, 3 also necessarily differ, so that the required dispersion in the resonance frequencies is effectively conducted.

EXAMPLES

Example 1

At a state of mounting an example tire having a tire size of 195/65 R15 on a rim of 6J, filling with an air pressure of 220 kPa and applying a load of 4.25 kN, the columnar resonance noise level (1000 Hz) and the overall level of the noise are measured at a speed ranging from 40 km/h to 100 km/h every 10 km/h according to JASO C606 standard, and the resistance to hydroplaning in the actual straight running is evaluated by entering a vehicle into a road surface having a water depth of 10 mm to measure a vehicle speed floating the tire.

The average values of these measured results are shown in Table 1.

Figure 8:
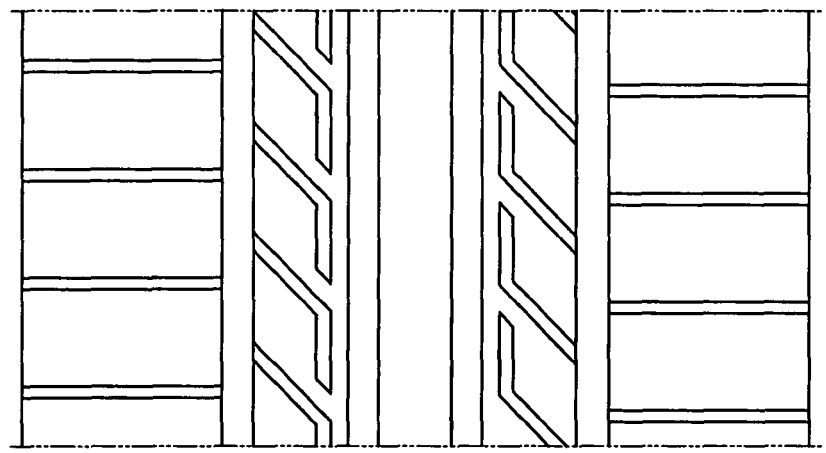
FIG. 8 is a developed view of a tread pattern of a comparative tire.

In Table 1, Example tire 1 has a tread pattern shown in FIG. 1, and Example tire 2 has a tread pattern shown in FIG. 3 and Example tire 3 has a tread pattern shown in FIG. 4. On the other hand, Comparative tire 1 has a tread pattern shown in FIG. 8 in which all of the lateral grooves and the shoulder lateral grooves opened to the ground contact end of the tread are opened to the shoulder-side circumferential groove.

Figure 9:
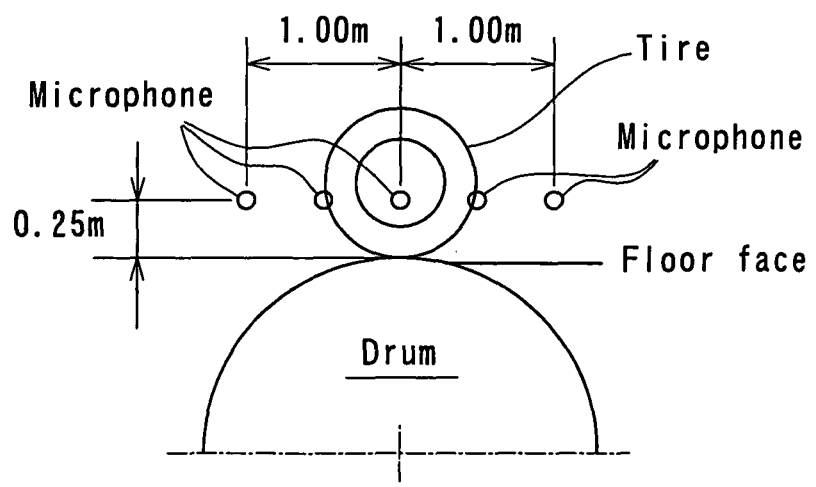
FIG. 9 is a schematic view showing a measuring embodiment of the noise.

In the measurement of the noise, as shown by a side view in FIG. 9, five microphones are arranged not only at a measuring position defined in JASO C606 but also at positions set every 50 cm within a range of 1 m forward and backward from the above measuring position, and the noise level is determined by calculating an average value from the measured waveforms.

TABLE 1

|  | Comparative tire 1 (FIG. 8) | Example tire 1 (FIG. 1) |
| --- | --- | --- |
| Columnar resonance noise level (1000 Hz) | control | −1.6 dB (A) |
| Overall level | control | −0.7 dB (A) |
| Resistance to hydroplaning (Index)* | 100 | 100 |
|  | Example tire 2 (FIG. 3) | Example tire 3 (FIG. 4) |
| Columnar resonance noise level (1000 Hz) | −1.9 dB (A) | −3.0 dB (A) |
| Overall level | −0.8 dB (A) | −1.0 dB (A) |
| Resistance to hydroplaning (Index)* | 100 | 100 |

*Index value shows that the larger it becomes, the more excellent the result is.

As seen from Table 1, all Example tires can advantageously reduce the noise while effectively controlling the lowering of the wet performance and also the effect of reducing the noise is improved in accordance with the increase of the length of the lateral groove Example 2

Figure 10:
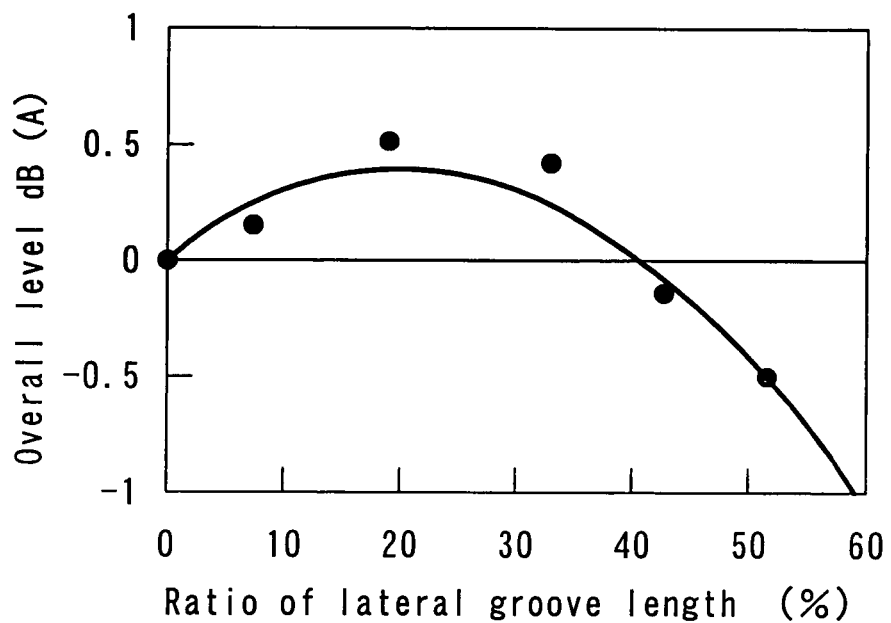
FIG. 10 is a graph showing a state of a change of the noise level with respect to a change of the length ratio of the lateral groove.

Next, the change of the overall level in the noise and the change of the columnar resonance are measured in the same manner as mentioned above under the same conditions as in Example 1 using the ratio of the lateral groove length to the circumferential groove length in the ground contact face to obtain the effect shown by a graph in FIG. 10.

As seen from FIG. 10, the noise level violently lowers when the ratio of the lateral groove length is more than 40%.

Example 3

At a state of mounting an example tire having a tire size of 195/65 R14 on a rim of 6J, filling with an air pressure of 200 kPa and applying a load of 4.9 kN, the columnar resonance noise level (1000 Hz) and the overall level of the noise are measured at a speed of 80 km/h in the same manner as in Example 1, and the resistance to hydroplaning in the straight running is also evaluated in the same manner as in Example 1.

The average values of these measured results are shown in Table 2.

Figure 11:
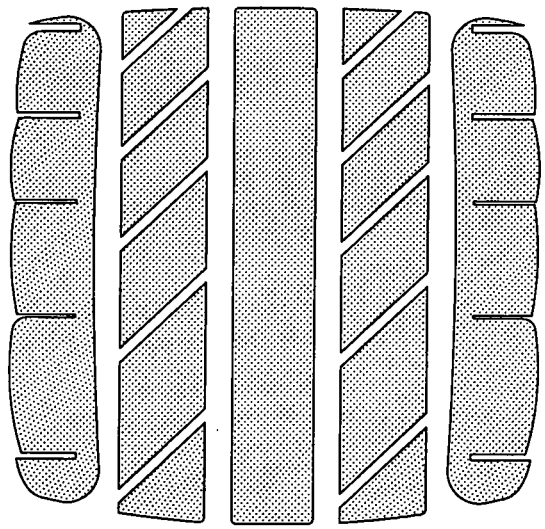
FIG. 11 is a view showing a footprint of another comparative tire.

In Table 2, Example tire 4 has a footprint (l/L=0.4) shown in FIG. 5 and Comparative tire 2 has a footprint shown in FIG. 11.

TABLE 2

|  | Comparative tire 2 (FIG. 11) | Example tire 4 (FIG. 5) |
|---|---|---|
| Columnar resonance noise level (1000 Hz) | 80.2 dB (A) | 78.9 dB (A) (−1.3) |
| Overall level | 86.5 dB (A) | 86.0 dB (A) (−0.5) |
| Resistance to hydroplaning (Index)* | 100 | 100 |

*Index value shows that the larger it becomes, the more excellent the result is.

As seen from Table 2, the noise level can be reduced without lowering the wet performances, especially a hydroplaning property in question.

INDUSTRIAL APPLICABILITY

As seen from the above examples, according to the invention, the noises generated in the tire, particularly columnar resonance can be effectively reduced while sufficiently highly ensuring the wet performances of the tire.

The invention claimed is:

1. A pneumatic tire comprising a tread, said tread comprising
   at least one circumferential groove, which extends continuously in the circumferential direction of the tire and which is disposed in a treading face;
   a selected plurality of lateral grooves,
   each of the selected plurality of lateral grooves having a first end opened to the at least one circumferential groove,
   each of the selected plurality of lateral grooves having a second end, which terminates in a land portion, and
   each of the selected plurality of lateral grooves is formed by a single continuous groove wall, respectively, extending from the first end opened to the at least one circumferential groove to the second end and back to the first end,
   wherein each of the selected plurality of lateral grooves is formed independently of any other lateral groove,
   wherein the at least one circumferential groove only connects to grooves, which have an end terminating in a land portion, said grooves including said selected plurality of lateral grooves,
   wherein each of the at least one circumferential groove and the selected plurality of lateral grooves has a groove width such that groove walls do not contact with each other at a tire posture when the tire is mounted on an approved rim and filled with a maximum air pressure and loaded with a mass corresponding to a maximum load capacity,
   wherein at least one of the selected plurality of lateral grooves is always completely included in a ground contact face of the tread,
   wherein a portion of the at least one of the selected plurality of lateral grooves has a groove width corresponding to not less than 30% of a groove width of the at least one circumferential groove to which the at least one of the selected plurality of lateral grooves is connected, and the at least one of the selected plurality of lateral grooves has an extending length in the ground contact face of not less than 40% and not greater than 80% of an extending length of the at least one circumferential groove, to which the at least one of the selected plurality of lateral grooves is connected, in the ground contact face,
   wherein the portion of the at least one of the selected plurality of lateral grooves extends from the first end,
   wherein the groove width of the at least one of the first plurality of lateral grooves is substantially constant from the first end to the second end, and
   wherein the tread further comprises at least one shoulder groove having a groove width such that groove walls do not contact with each other at a tire posture when the tire is mounted on an approved rim and filled with a maximum air pressure and loaded with a mass corresponding to a maximum load capacity.

2. A pneumatic tire comprising a tread, said tread comprising
   at least one first circumferential groove, which extends continuously in the circumferential direction of the tire and which is disposed in a treading face;
   at least one second circumferential groove, which extends continuously in the circumferential direction of the tire and which is disposed in the treading face;
   a first plurality of lateral grooves,
   each of the first plurality of lateral grooves having a first end opened to the at least one first circumferential groove,
   each of the first plurality of lateral grooves having a second end, which terminates in a land portion, and
   each of the first plurality of lateral grooves is formed by a single continuous groove wall, respectively, extending from the first end opened to the at least one first circumferential groove to the second end and back to the first end,
   wherein each of the first plurality of lateral grooves is formed independently of a second plurality of lateral grooves, each of said second plurality of lateral grooves opened to the at least one second circumferential groove and not opened to the at least one first circumferential groove,
   wherein said at least one first circumferential groove is separated from said at least one second circumferential groove and said at least one first circumferential groove is formed independent of the second plurality of lateral grooves,
   wherein the at least one first circumferential groove only connects to grooves which have an end terminating in a land portion, said grooves including said first plurality of lateral grooves,
   wherein each of the at least one first circumferential groove and the first plurality of lateral grooves has a groove width such that groove walls do not contact with each other at a tire posture when the tire is mounted on an approved rim and filled with a maximum air pressure and loaded with a mass corresponding to a maximum load capacity, wherein at least one of the first plurality of lateral grooves is always completely included in a ground contact face of the tread, wherein a portion of the at least one of the first plurality of lateral grooves has a groove width corresponding to not less than 30% of a groove width of the corresponding first circumferential groove to which the at least one of the first plurality of lateral grooves is connected, and the at least one of the first plurality of lateral grooves has an extending length in the ground contact face of not less than 40% and not greater than 80% of an extending length of the corresponding first circumferential groove, to which the at least one of the first plurality of lateral grooves is connected, in the ground contact face, wherein the portion of the at least one of the first plurality of lateral grooves extends from the first end, wherein the groove width of the at least one of the first plurality of lateral grooves is substantially constant from the first end to the second end, and wherein the second lateral grooves have a groove width such that groove walls do not contact with each other at a tire posture when the tire is mounted on an approved rim and filled with a maximum air pressure and loaded with a mass corresponding to a maximum load capacity.

3. A pneumatic tire according to claim 1, wherein at least two first circumferential grooves are formed in the treading face.

4. A pneumatic tire according to claim 1, wherein additional lateral grooves having a length of not more than 10 mm are formed on the side of the at least one first circumferential groove closer to a tire equator than the other side of the at least one first circumferential groove.

5. A pneumatic tire comprising a tread, said tread comprising at least one first circumferential groove, which extends continuously in the circumferential direction of the tire and which is disposed in a treading face;

at least one second circumferential groove, which extends continuously in the circumferential direction of the tire and which is disposed in the treading face;

a first plurality of lateral grooves, each of the first plurality of lateral grooves having a first end opened to the at least one first circumferential groove, each of the first plurality of lateral grooves having a second end, which terminates in a land portion, and each of the first plurality of lateral grooves is formed by a single continuous groove wall, respectively, extending from the first end opened to the at least one first circumferential groove to the second end and back to the first end, wherein each of the first plurality of lateral grooves is formed independently of a second plurality of lateral grooves, each of said second plurality of lateral grooves opened to the at least one second circumferential groove and not opened to the at least one first circumferential groove, wherein said at least one first circumferential groove is separated from said at least one second circumferential groove and said at least one first circumferential groove is formed independent of the second plurality of lateral grooves, wherein the at least one first circumferential groove only connects to grooves which have an end terminating in a land portion, said grooves including said first plurality of lateral grooves, wherein each of the at least one first circumferential groove and the first plurality of lateral grooves has a groove width such that groove walls do not contact with each other at a tire posture when the tire is mounted on an approved rim and filled with a maximum air pressure and loaded with a mass corresponding to a maximum load capacity, wherein at least one of the first plurality of lateral grooves is always completely included in a ground contact face of the tread, wherein a portion of the at least one of the first plurality of lateral grooves has a groove width corresponding to not less than 30% of a groove width of the corresponding first circumferential groove to which the at least one of the first plurality of lateral grooves is connected, and the at least one of the first plurality of lateral grooves has an extending length in the ground contact face of not less than 40% and not greater than 80% of an extending length of the corresponding first circumferential groove, to which the at least one of the first plurality of lateral grooves is connected, in the ground contact face, wherein the portion of the at least one of the first plurality of lateral grooves extends from the first end, wherein the groove width of the at least one of the first plurality of lateral grooves is substantially constant from the first end to the second end, wherein each of the second plurality of lateral grooves is arranged to extend continuously between one ground contacting end of the tread and the at least one second circumferential groove, wherein the at least one second circumferential groove is located further away from a tire equator than the at least one first circumferential groove, wherein each of the second plurality of lateral grooves is opened to both the at least one second circumferential groove and the ground contact end, and wherein at least one of the second plurality of lateral grooves has a groove width of 1-3 mm in the ground contact face.

* * * * *